United States Patent
Tsai et al.

(10) Patent No.: US 8,503,144 B2
(45) Date of Patent: Aug. 6, 2013

(54) CONTROL CIRCUIT WITH PROTECTION CIRCUIT FOR POWER SUPPLY

(75) Inventors: Meng-Jen Tsai, Hsinchu (TW); Chao-Chih Lin, Taoyuan County (TW); Rui-Hong Lu, Chiayi County (TW); Chiu-Chih Chiang, Hsinchu (TW)

(73) Assignee: System General Corp., Taipei Hsien (TW)

( * ) Notice: Subject to any disclaimer, the term of this patent is extended or adjusted under 35 U.S.C. 154(b) by 258 days.

(21) Appl. No.: 12/338,112

(22) Filed: Dec. 18, 2008

(65) Prior Publication Data

US 2010/0091420 A1 Apr. 15, 2010

(30) Foreign Application Priority Data

Nov. 10, 2008 (CN) .......................... 2008 1 0175259

(51) Int. Cl.
*H02H 3/20* (2006.01)
(52) U.S. Cl.
USPC .......................................................... 361/90

(58) Field of Classification Search
USPC ............................................................ 361/90
See application file for complete search history.

(56) References Cited

U.S. PATENT DOCUMENTS

| 4,432,031 | A * | 2/1984 | Premerlani ..................... 361/97 |
| 5,227,711 | A * | 7/1993 | Gruensfelder ................ 318/807 |
| 5,754,250 | A * | 5/1998 | Cooper ......................... 348/525 |
| 6,344,981 | B1 * | 2/2002 | Norton et al. ............. 363/21.01 |
| 2006/0056204 | A1 * | 3/2006 | Yang et al. ..................... 363/10 |
| 2006/0106502 | A1 * | 5/2006 | See et al. ...................... 700/286 |
| 2009/0021233 | A1 * | 1/2009 | Hsu .............................. 323/290 |

* cited by examiner

*Primary Examiner* — Scott Bauer
(74) *Attorney, Agent, or Firm* — Ming Chow; Sinorica, LLC

(57) ABSTRACT

A control circuit with protection circuit for power supply according to the present invention comprises a peak-detection circuit and a protection circuit. The peak-detection circuit detects an AC input voltage and generates a peak-detection signal. The protection circuit generates a reset signal to reduce the output of the power supply in response to the peak-detection signal. The present invention can protect the power supply in response to the AC input voltage effectively through the peak-detection circuit.

6 Claims, 4 Drawing Sheets

# CONTROL CIRCUIT WITH PROTECTION CIRCUIT FOR POWER SUPPLY

BACKGROUND OF THE INVENTION

1. Field of the Invention

The present invention relates to a power supply. More particularly, the present invention relates to a control circuit with protection circuit for power supply.

2. Description of the Prior Art

As the technology is improving and more and more electronic products are developed for people's need with better functions which make people's life convenient. Most of the electronic products need a power supply which receives the AC input voltage and providing suitable power for electronic products with safety.

Referring to the FIG. 1, it shows a circuit diagram of a conventional power supply. As shown in FIG. 1, the conventional power supply comprises a transformer $T_1$ having a primary winding $N_P$ and a secondary winding $N_S$. One terminal of the primary winding $N_P$ is coupled to an output terminal of a rectifier 10. Another terminal of the primary winding $N_P$ is coupled to a power transistor $Q_1$. The power transistor $Q_1$ is coupled to the ground through a sense resistor $R_S$. The sense resistor $R_S$ senses a switching current $I_P$ of the power transistor $Q_1$ for generating a sense signal $V_{CS}$. The rectifier 10 rectifies an AC (alternative current) input voltage $V_{AC}$. The output terminal of the rectifier 10 is coupled to a filter capacitor $C_{bulk}$ to filter the output of the rectifier 10 for generating a rectifying voltage $V_{bulk}$ at the filter capacitor $C_{bulk}$. One terminal of the secondary winding $N_S$ of the transformer $T_1$ is coupled to one terminal of a rectifier $D_O$. An output capacitor $C_O$ is coupled between another terminal of the rectifier $D_O$ and another terminal of the secondary winding $N_S$. The output capacitor $C_O$ is also coupled to an output terminal of the power supply which provides a regulated output voltage $V_O$.

As shown in FIG. 1, the control circuit of the conventional power supply comprises a flip-flop 20 to generate a switching signal $V_{PWM}$ for controlling the power transistor $Q_1$ of the power supply. A clock input terminal CK of the flip-flop 20 is coupled to an oscillator 22 to receive a pulse signal PLS generated by the oscillator 22. An input terminal D of the flip-flop 20 is coupled to a supply voltage $V_{CC}$. An output terminal Q of the flip-flop 20 generates the switching signal $V_{PWM}$ for controlling the power transistor $Q_1$ of the power supply. The control circuit of the power supply further comprises a voltage-divider having two resistors $R_A$ and $R_B$. The resistor $R_A$ is coupled to the output terminal of the rectifier 10. The resistor $R_B$ is coupled between the resistor $R_A$ and the ground. A filter capacitor $C_F$ is coupled to the resistor $R_B$ in parallel for filtering and generating an input voltage $V_{IN}$.

As shown in FIG. 1, a positive input terminal of a comparator 31 receives a threshold signal $V_M$. A negative input terminal of the comparator 31 is coupled to the sense resistor $R_S$ to receive the sense signal $V_{CS}$ for comparing the threshold signal $V_M$ with the sense signal $V_{CS}$. A positive input terminal of a comparator 32 receives the input voltage $V_{IN}$. A negative input terminal of the comparator 32 receives a reference voltage $V_{REF}$ for comparing the input voltage $V_{IN}$ with the reference voltage $V_{REF}$. An AND gate 33 receives the outputs of the comparators 31 and 32 to generate a reset signal RST which turns off the switching signal $V_{PWM}$ for protecting the power supply.

Referring to the FIG. 2, it shows the waveforms of the rectifying voltage $V_{bulk}$ of the filter capacitor $C_{bulk}$ and the input voltage $V_{IN}$ of the filter capacitor $C_F$. The input voltage $V_{IN}$ is generated by the rectifying voltage $V_{bulk}$ through the voltage-divider and further filtered by the filter capacitor $C_F$. The positive input terminal of the comparator 32 receives the input voltage $V_{IN}$. As shown in FIG. 2, the filter capacitor $C_F$ filters the input voltage $V_{IN}$ which is divided by the rectifying voltage $V_{bulk}$, but the input voltage $V_{IN}$ still has the voltage ripple. The voltage ripple causes that the comparator 32 can not precisely compare the input voltage $V_{IN}$ with the reference voltage $V_{REF}$. Therefore, the output of the comparator 32 can not control the switching signal $V_{PWM}$ to reduce an output of the power supply accurately. It means that the control circuit of the power supply is not protected accurately, and therefore the safety of the power supply is reduced.

Thus, according to the problems described above, the present invention provides a control circuit with a protection circuit for power supply that can control switching signal for protecting the power supply in response to the peak of the AC input voltage accurately.

SUMMARY OF THE INVENTION

The purpose of the present invention is to provide a control circuit with a protection circuit for power supply that detects the peak of the AC input voltage through the peak-detection circuit for protecting the power supply accurately.

A control circuit with a protection circuit for power supply according to the present invention comprises a peak-detection circuit and a protection circuit. The peak-detection circuit detects an AC input voltage and generates a peak-detection signal. The protection circuit generates a reset signal to reduce the output of the power supply in response to the peak-detection signal. Moreover, the control circuit of the present invention further comprises a sample-hold circuit which samples the peak-detection signal and generates a hold signal. The protection circuit further generates the reset signal to reduce the output of the power supply in response to the hold signal. The control circuit further comprises a switching circuit which generates a switching signal in response to a pulse signal. The switching signal controls a power switch of the power supply for controlling the output of the power supply.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention, and, together with the description, serve to explain the principles of the invention.

DESCRIPTION OF THE PREFERRED EMBODIMENTS

Figure 1:
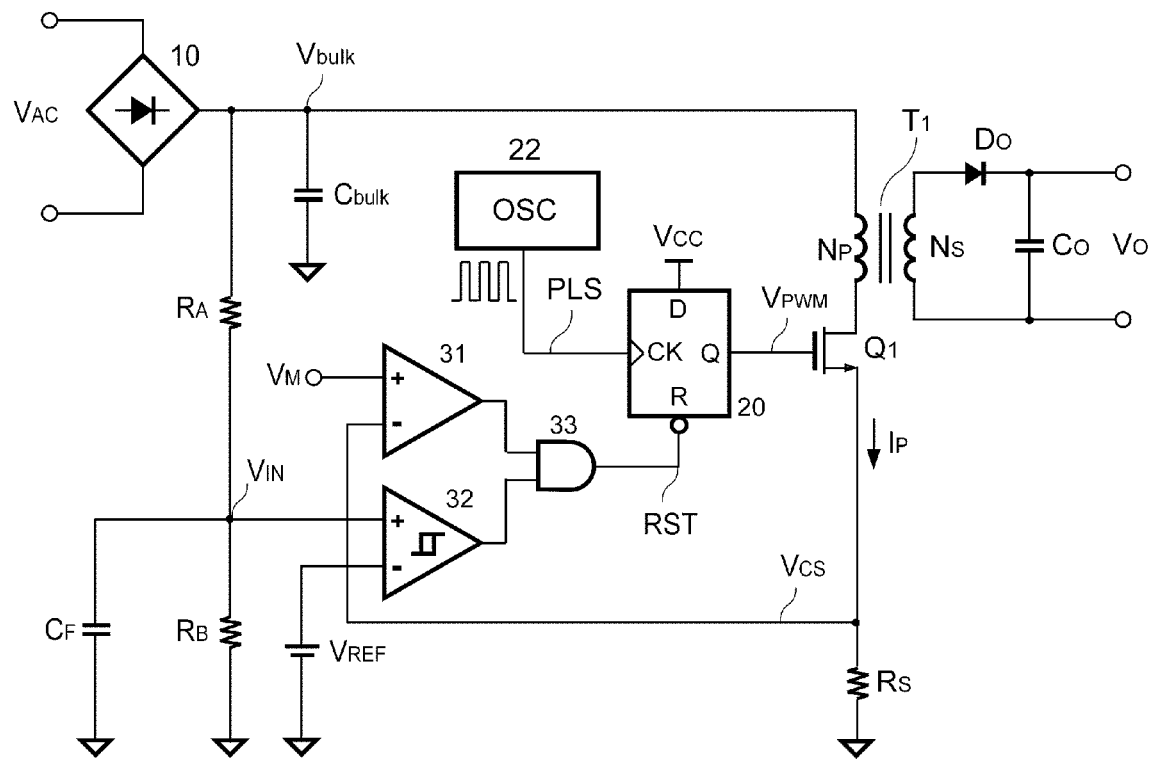
FIG. 1 shows a circuit diagram of a conventional power supply.
Figure 2:
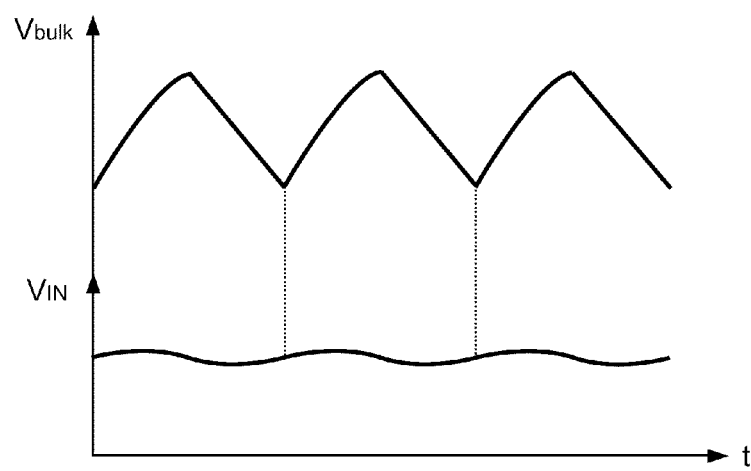
FIG. 2 shows waveform of the conventional power supply.
Figure 3:
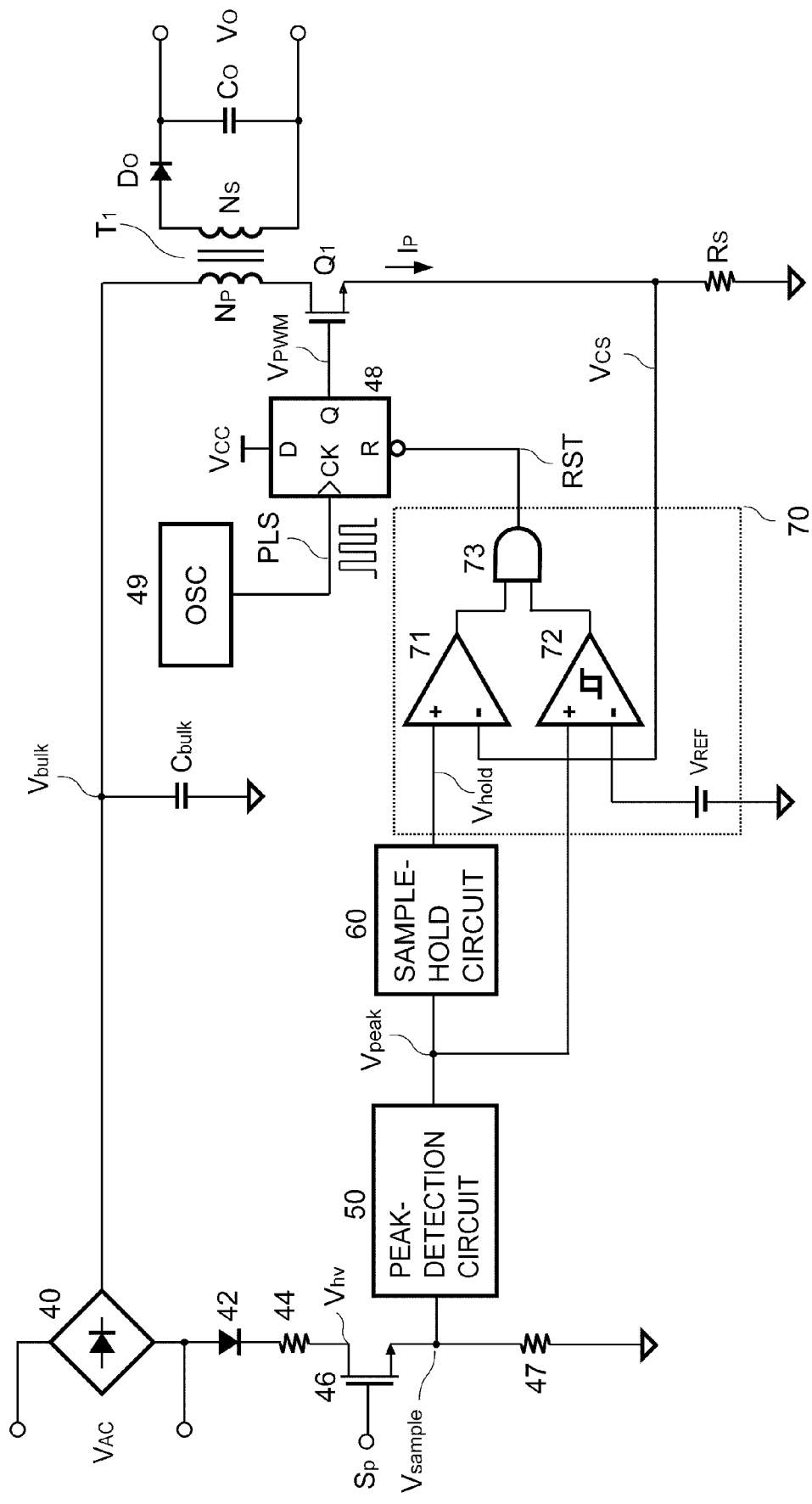
FIG. 3 shows a circuit diagram of a preferred embodiment of the power supply according to the present invention.

Referring to FIG. 3, it shows a circuit diagram of a preferred embodiment of a power supply according to the present invention. As shown in FIG. 3, the power supply comprises a transformer $T_1$ which transfers a stored energy from a primary side to a secondary side for providing a regulated output voltage $V_O$. The primary side and the secondary side of the transformer $T_1$ have a primary winding $N_P$ and a secondary winding $N_S$ respectively. One terminal of the primary winding $N_P$ is coupled to a rectifier 40. Another terminal of the primary winding $N_P$ is coupled to a power switch $Q_1$. The power switch $Q_1$ is coupled to a sense device in series. In this embodiment, the sense device is a sense resistor $R_S$. One terminal of the power switch $Q_1$ is coupled to one terminal of the sense resistor $R_S$. Another terminal of the sense resistor $R_S$ is coupled to the ground. The sense resistor $R_S$ is utilized to sense a switching current $I_P$ of the power switch $Q_1$ for generating a sense signal $V_{CS}$. The power switch $Q_1$ is utilized to control the transformer $T_1$ for controlling the output voltage $V_O$ of the power supply. The power switch $Q_1$ can be a transistor according to a preferred embodiment of the present invention.

The rectifier 40 receives and rectifies an AC input voltage $V_{AC}$. An output terminal of the rectifier 40 is coupled to a filter capacitor $C_{bulk}$ to filter the voltage which is rectified by the rectifier 40 for generating a rectifying voltage $V_{bulk}$. One terminal of the secondary winding $N_S$ of the transformer $T_1$ is coupled to one terminal of the rectifier $D_O$. An output capacitor $C_O$ is coupled between another terminal of the rectifier $D_O$ and another terminal of the secondary winding $N_S$. The output capacitor $C_O$ is also coupled to an output terminal of the power supply. The output terminal of the power supply provides the output voltage $V_O$.

As shown in FIG. 3, the control circuit of the present invention comprises a switching circuit which generates a switching signal $V_{PWM}$. The switching signal $V_{PWM}$ controls the power switch $Q_1$ to control the transformer $T_1$ for controlling the output voltage $V_O$ of the power supply. The switching circuit of the present invention comprises a flip-flop 48 and an oscillator 49 (OSC). The oscillator 49 generates a pulse signal PLS. An input terminal D of the flip-flop 48 receives a supply voltage $V_{CC}$. A clock input terminal CK of the flip-flop 48 receives the pulse signal PLS. An output terminal Q of the flip-flop 48 generates the switching signal $V_{PWM}$ to control the power switch $Q_1$ of the power supply for controlling the output voltage $V_O$ of the power supply.

Figure 4:
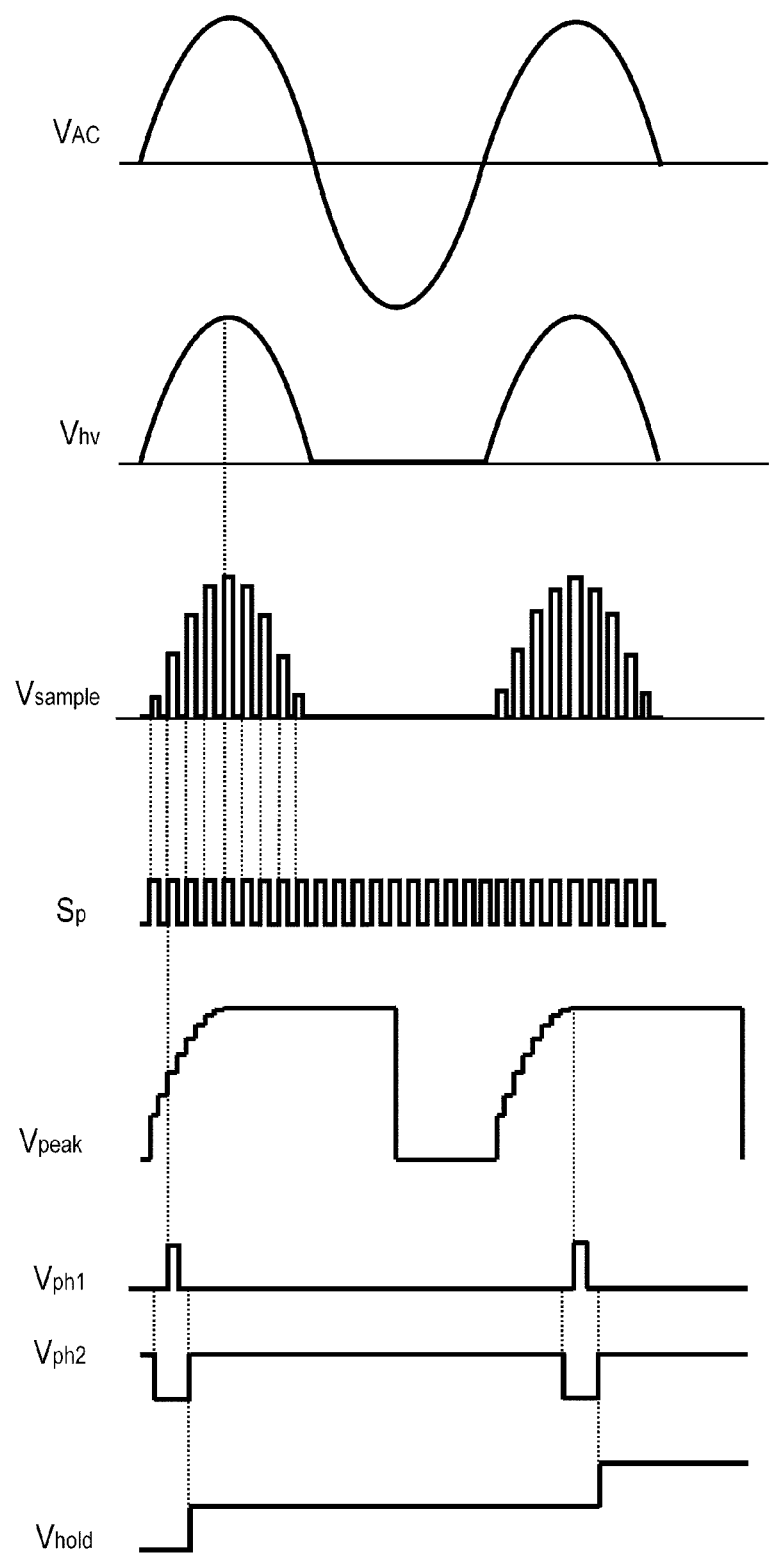
FIG. 4 shows waveform of a preferred embodiment of the power supply according to the present invention.

As shown in FIG. 3, the control circuit of the present invention further comprises a diode 42 which is coupled to an input terminal of the rectifier 40. A resistor 44 is coupled between the diode 42 and a sample switch 46. A detecting device is coupled between the sample switch 46 and the ground. The detecting device can be a resistor 47 according to an embodiment of the present invention. The sample switch 46 receives a half-wave voltage $V_{hv}$ which is rectified through the diode 42 in accordance with the AC input voltage $V_{AC}$. The half-wave voltage $V_{hv}$ is correlated to the AC input voltage $V_{AC}$. The sample-switch 46 is controlled by a sample control signal $S_P$ to sample the half-wave voltage $V_{hv}$ for generating a sample current. The resistor 47 detects the sample current and generates a sample signal $V_{sample}$. The sample switch 46 can be a transistor according to an embodiment of the present invention. The sample control signal $S_P$ having a periodic switching is used to turn on and turn off the sample-switch 46 during a fixed period. The waveform of the sample control signal $S_P$ is shown in FIG. 4. The sample control signal $S_P$ can be generated by a variety of circuits. One of embodiments is that the sample control signal $S_P$ is generated by the internal circuit of the power supply. It is the conventional technology and so no more description here.

As shown in FIG. 3, the control circuit of the present invention further comprises a peak-detection circuit 50, a sample-hold circuit 60 and a protection circuit 70. The sample-hold circuit 60 is coupled between the peak-detection circuit 50 and the protection circuit 70. The peak-detection circuit 50 receives and detects the sample signal $V_{sample}$ for generating a peak-detection signal $V_{peak}$. The sample-hold circuit 60 receives and samples the peak-detection signal $V_{peak}$ for generating a hold signal $V_{hold}$. Due to the sample signal $V_{sample}$ is correlated to the AC input voltage $V_{AC}$, so the peak-detection circuit 50 is utilized to detect the peak of the AC input voltage $V_{AC}$ and to generate the peak-detection signal $V_{peak}$. The protection circuit 70 generates a reset signal RST to turn off the switching signal $V_{PWM}$ for protecting the power supply when the amplitude of the AC input voltage $V_{AC}$ is too low or the peak of the switching current $I_P$ is too high.

The protection circuit 70 comprises a comparator 71, a hysteresis comparator 72 and a logic circuit. The comparator 71 and the hysteresis comparator 72 serve as an over-current protection circuit and an under-voltage protection circuit. The logic circuit can be an AND gate 73 according to an embodiment of the present invention. A positive input terminal of the comparator 71 receives the hold signal $V_{hold}$, a negative input terminal of the comparator 71 receives the sense signal $V_{CS}$. The sense signal $V_{CS}$ is correlated to the switching current $I_P$. The comparator 71 compares the hold signal $V_{hold}$ with the sense signal $V_{CS}$ and generates an over-current protection signal when the sense signal $V_{CS}$ is higher than the hold signal $V_{hold}$. A positive input terminal of the hysteresis comparator 72 receives the peak-detection signal $V_{peak}$, a negative input terminal of the hysteresis comparator 72 receives a reference voltage $V_{REF}$. The hysteresis comparator 72 compares the peak-detection signal $V_{peak}$ with the reference voltage $V_{REF}$ and generates an under-voltage protection signal when the peak-detection signal $V_{peak}$ is lower than the reference voltage $V_{REF}$. The logic circuit receives the over-current protection signal and the under-voltage protection signal to generate the reset signal RST for cycle-by-cycle turning off the switching signal $V_{PWM}$. The logic circuit generates the reset signal RST for cycle-by-cycle turning off the switching signal $V_{PWM}$ when the logic circuit receives the over-current protection signal or the under-voltage protection signal and the over-current protection signal or the under-voltage protection signal is at a low-level. It means that the over-current protection signal of the comparator 71 and the under-voltage protection signal of the hysteresis comparator 72 are utilized to reduce the output of the power supply for protecting the power supply.

Referring to FIG. 4, it shows waveform of a preferred embodiment of the power supply according to the present invention. As shown in FIG. 4, the half-wave voltage $V_{hv}$ is generated through rectifying the AC input voltage $V_{AC}$ by diode 42 (as shown in FIG. 3). The sample signal $V_{sample}$ is generated by sampling the half-wave voltage $V_{hv}$ in response to the sample control signal $S_P$. The sample control signal $S_P$ is used to turn on and turn off the sample switch 46 periodically during a fixed period. The peak-detection circuit 50 (as shown in FIG. 3) detects the sample signal $V_{sample}$ for generating the peak-detection signal $V_{peak}$. According to the FIG. 4, the peak-detection signal $V_{peak}$ doesn't have voltage ripple to compare with the reference voltage $V_{REF}$. Thus, the hysteresis comparator 72 can compare the peak-detection signal $V_{peak}$ with the reference voltage $V_{REF}$ accurately for protecting the power supply and increasing the efficiency of the power supply. Besides, the sample-hold circuit 60 (as shown in FIG. 3) samples the peak-detection signal $V_{peak}$ for generating the hold signal $V_{hold}$ in response to the control signals $V_{ph1}$ and $V_{ph2}$. The hold signal $V_{hold}$ doesn't have voltage ripple, and therefore the comparator 71 can compare the hold signal $V_{hold}$ with the sense signal $V_{CS}$ accurately for protecting the power supply.

Figure 5:
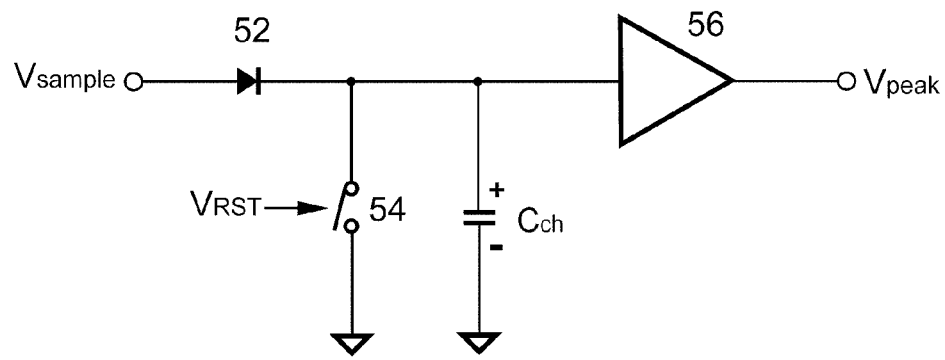
FIG. 5 shows a circuit diagram of a preferred embodiment of the peak-detection circuit according to the present invention.

Referring to FIG. 5, it shows a circuit diagram of a preferred embodiment of the peak-detection circuit according to the present invention. As shown in FIG. 5, the peak-detection circuit 50 comprises a diode 52, a discharge switch 54, a capacitor $C_{ch}$ and a buffer 56. An anode of the diode 52 is coupled to receive the sample signal $V_{sample}$. The capacitor $C_{ch}$ is coupled between a cathode of the diode 52 and the ground. The sample signal $V_{sample}$ charges the capacitor $C_{ch}$. The discharge switch 54 is coupled between the capacitor $C_{ch}$ and the ground to discharge the capacitor $C_{ch}$. The discharge switch 54 is controlled by a reset signal $V_{RST}$. The reset signal $V_{RST}$ can be generated by a variety of means. One of embodiments is that the reset signal $V_{RST}$ is generated by the internal circuit of the power supply. It is the conventional technology. An input terminal of the buffer 56 is coupled to the capacitor $C_{ch}$ and the cathode of the diode 52. An output terminal of the buffer 56 outputs the peak-detection signal $V_{peak}$.

Figure 6:
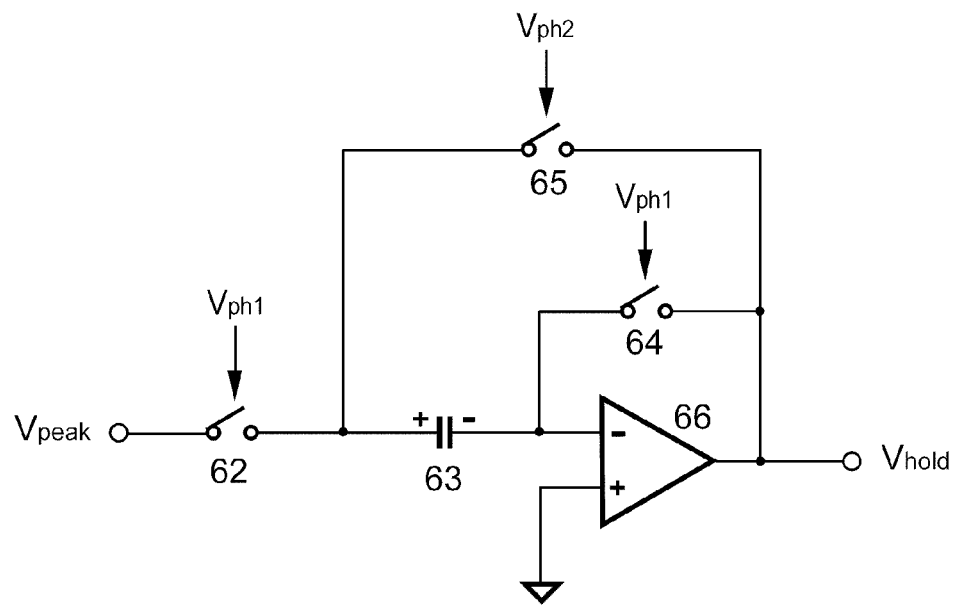
FIG. 6 shows a circuit diagram of a preferred embodiment of the sample-hold circuit according to the present invention.

Referring to FIG. 6, it shows a circuit diagram of a preferred embodiment of the sample-hold circuit according to the present invention. As shown in FIG. 6, the sample-hold circuit 60 is coupled to receive and sample the peak-detection signal $V_{peak}$ for generating the hold signal $V_{hold}$. The sample-hold circuit 60 comprises the switches 62, 64 and 65, a capacitor 63 and a comparator 66. One terminal of the switch 62 is coupled to the output terminal of the peak-detection circuit 50 (as shown in FIG. 3) to receive the peak-detection signal $V_{peak}$. Another terminal of the switch 62 is coupled to a first terminal of the capacitor 63. A second terminal of the capacitor 63 is coupled to a negative input terminal of the comparator 66. A positive input terminal of the comparator 66 is coupled to the ground. An output terminal of the comparator 66 generates the hold signal $V_{hold}$. The switch 64 is coupled between the negative input terminal of the comparator 66 and the output terminal of the comparator 66. The switches 62 and 64 are controlled by the control signal $V_{ph1}$. The switch 65 is coupled between the first terminal of the capacitor 63 and the output terminal of the comparator 66. The switch 65 is controlled by the control signal $V_{ph2}$. The control signals $V_{ph1}$ and $V_{ph2}$ can be generated by a variety of means. Both of the control signals $V_{ph1}$ and $V_{ph2}$ are reverse and keeping a dead time during the rising edge and the falling edge to avoid the control signals $V_{ph1}$ and $V_{ph2}$ being enabling simultaneously. The waveforms of the control signals $V_{ph1}$ and $V_{ph2}$ have shown in FIG. 4. One of embodiments of generating the control signals $V_{ph1}$ and $V_{ph2}$ is that the internal circuit of the power supply generates the control signals $V_{ph1}$ and $V_{ph2}$. It is the conventional technology.

According to the above description, the control circuit of the power supply according to the present invention comprises the peak-detection circuit, the sample-hold circuit and the protection circuit. The peak-detection circuit detects the AC input voltage to generate the peak-detection signal. The sample-hold circuit samples the peak-detection signal to generate the hold signal. The protection circuit generates the reset signal to reduce the output of the power supply in response to the peak-detection signal or the hold signal. The control circuit of present invention utilizes the peak-detection circuit to detect the peak of the AC input voltage to control the switching signal for protecting the power supply accurately.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims or their equivalents.

What is claimed is:

1. A control circuit with protection circuit for power supply, comprising:
   a peak-detection circuit, generating a peak-detection signal in response to an AC input voltage;
   a sample-hold circuit, sampling the peak-detection signal to generate a hold signal; and
   an over-current protection circuit, generating an over-current protection signal to reduce an output of the power supply in response to the hold signal and a switching current of the power supply;
   wherein the switching current is changed according to a change of a load of the power supply.

2. The control circuit with protection circuit for power supply as claimed in claim 1, further comprising a switching circuit, the switching circuit generating a switching signal for controlling a power switch of the power supply in response to a pulse signal, in which the power switch controls the output of the power supply.

3. The control circuit with protection circuit for power supply as claimed in claim 2, wherein the switching circuit comprises an oscillator which generates the pulse signal.

4. The control circuit with protection circuit for power supply as claimed in claim 2, wherein the switching circuit comprises a flip-flop which receives the pulse signal to generate the switching signal.

5. The control circuit with protection circuit for power supply as claimed in claim 1, further comprising a sense device coupled to a power switch of the power supply and generating a sense signal in response to the switching current of the power switch, the over-current protection circuit generating the over-current protection signal to reduce the output of the power supply in response to the hold signal and the sense signal.

6. The control circuit with protection circuit for power supply as claimed in claim 1, further comprising:
   a sample switch, sampling the AC input voltage to generate a sample current; and
   a detecting device, detecting the sample current to generate a sample signal, the peak-detection circuit detecting the sample signal to generate the peak-detection signal.

* * * * *